United States Patent
Dunn et al.

(10) Patent No.: US 7,707,247 B2
(45) Date of Patent: Apr. 27, 2010

(54) SYSTEM AND METHOD FOR DISPLAYING USERS IN A VISUAL CONFERENCE BETWEEN LOCATIONS

(75) Inventors: Kristin A. Dunn, Livermore, CA (US); Philip R. Graham, Milpitas, CA (US); Richard T. Wales, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 11/483,864

(22) Filed: Jul. 10, 2006

(65) Prior Publication Data

US 2007/0250568 A1 Oct. 25, 2007

Related U.S. Application Data

(60) Provisional application No. 60/794,016, filed on Apr. 20, 2006.

(51) Int. Cl.
*G06F 15/16* (2006.01)
(52) U.S. Cl. .................... 709/204; 348/14.1; 348/211.3; 725/144
(58) Field of Classification Search .............. 348/211.8; 725/93
See application file for complete search history.

(56) References Cited

U.S. PATENT DOCUMENTS

| | | | | |
|---|---|---|---|---|
| 4,400,724 A | 8/1983 | Fields | ................. | 358/85 |
| 4,494,144 A | 1/1985 | Brown | ................. | 348/420.1 |
| 4,961,211 A * | 10/1990 | Tsugane et al. | ................. | 348/14.08 |
| 4,965,819 A | 10/1990 | Kannes | ................. | 379/53 |
| 5,272,526 A | 12/1993 | Yoneta et al. | ................. | 358/85 |
| 5,491,797 A | 2/1996 | Thompson et al. | ................. | 395/200.03 |
| 5,508,733 A * | 4/1996 | Kassatly | ................. | 725/93 |
| 5,541,639 A | 7/1996 | Takatsuki et al. | ................. | 348/15 |
| 5,673,256 A | 9/1997 | Maine | ................. | 370/271 |
| 5,675,374 A * | 10/1997 | Kohda | ................. | 348/14.1 |
| 5,737,011 A * | 4/1998 | Lukacs | ................. | 348/14.09 |
| 5,751,337 A | 5/1998 | Allen et al. | ................. | 348/15 |
| 5,790,179 A * | 8/1998 | Shibata et al. | ................. | 348/14.09 |
| 5,801,756 A | 9/1998 | Iizawa | ................. | 348/14.11 |
| 5,802,294 A | 9/1998 | Ludwig et al. | ................. | 395/200.34 |
| 5,903,637 A | 5/1999 | Hogan et al. | ................. | 379/203.01 |

(Continued)

OTHER PUBLICATIONS

Weinstein, et al., Emerging Technologies for Teleconferencing and Telepresence, *Wainhouse Research*, 54 pages, 2005.

(Continued)

*Primary Examiner*—Thong H Vu
(74) *Attorney, Agent, or Firm*—Baker Botts L.L.P.

(57) ABSTRACT

A method for displaying a visual conference includes receiving a plurality of video signals from at least two cameras located at one or more remote sites. The method also includes assigning each video signal to a respective display of a plurality of displays at a local site for the duration of a visual conference. At least one of the plurality of displays has more than one video signal assigned thereto. The method further includes selecting, for each of the at least one of the plurality of displays having more than one video signal assigned thereto, a video signal of the more than one video signal assigned to the display. The method also includes displaying each selected video signal on its respective display.

19 Claims, 2 Drawing Sheets

U.S. PATENT DOCUMENTS

| | | | | |
|---|---|---|---|---|
| 6,049,694 | A * | 4/2000 | Kassatly | 725/144 |
| 6,172,703 | B1 | 1/2001 | Lee | 348/15 |
| 6,346,962 | B1 * | 2/2002 | Goodridge | 348/14.05 |
| 6,396,531 | B1 | 5/2002 | Gerszberg et al. | 348/14.01 |
| 6,577,807 | B1 * | 6/2003 | Yaegashi et al. | 386/52 |
| 6,611,503 | B1 | 8/2003 | Fitzgerald et al. | 370/260 |
| 6,710,797 | B1 | 3/2004 | McNelley et al. | 348/14.16 |
| 6,711,212 | B1 | 3/2004 | Lin | 375/240.24 |
| 6,757,277 | B1 | 6/2004 | Shaffer et al. | 370/356 |
| 6,774,927 | B1 | 8/2004 | Cohen et al. | 348/14.1 |
| 6,775,247 | B1 | 8/2004 | Shaffer et al. | 370/260 |
| 6,795,108 | B2 | 9/2004 | Jarboe et al. | 348/14.09 |
| 6,798,441 | B2 | 9/2004 | Hartman et al. | 348/14.08 |
| 6,882,358 | B1 | 4/2005 | Schuster et al. | 348/14.16 |
| 6,886,036 | B1 | 4/2005 | Santamäki et al. | 709/223 |
| 6,922,718 | B2 | 7/2005 | Chang | 709/204 |
| 6,981,047 | B2 | 12/2005 | Hanson et al. | 709/227 |
| 6,989,836 | B2 | 1/2006 | Ramsey | 345/522 |
| 6,992,702 | B1 * | 1/2006 | Foote et al. | 348/211.8 |
| 6,999,829 | B2 | 2/2006 | Bazzocchi et al. | 700/99 |
| 7,027,659 | B1 * | 4/2006 | Thomas | 382/254 |
| 7,038,588 | B2 * | 5/2006 | Boone et al. | 340/573.1 |
| 7,039,027 | B2 | 5/2006 | Bridgelall | 370/329 |
| 7,043,528 | B2 | 5/2006 | Schmitt et al. | 709/204 |
| 7,050,425 | B2 | 5/2006 | Richter et al. | 370/352 |
| 7,054,268 | B1 | 5/2006 | Paranteinen et al. | 370/231 |
| 7,057,636 | B1 | 6/2006 | Cohen-Solal et al. | 348/14.08 |
| 7,068,299 | B2 | 6/2006 | Lemieux et al. | 348/14.03 |
| 7,080,105 | B2 | 7/2006 | Nakanishi et al. | 707/204 |
| 7,092,002 | B2 * | 8/2006 | Ferren et al. | 348/14.08 |
| 7,111,045 | B2 | 9/2006 | Kato et al. | 709/205 |
| 7,151,758 | B2 | 12/2006 | Kumaki et al. | 370/331 |
| 7,154,526 | B2 | 12/2006 | Foote et al. | 348/14.08 |
| 7,203,904 | B2 | 4/2007 | Lee | 715/717 |
| 7,245,272 | B2 | 7/2007 | Shiuan et al. | 345/2.2 |
| 7,256,822 | B2 * | 8/2007 | Suga et al. | 348/211.3 |
| 7,277,117 | B2 * | 10/2007 | Takashima et al. | 348/14.09 |
| 7,532,232 | B2 | 5/2009 | Shah et al. | 348/14.09 |
| 2002/0099682 | A1 | 7/2002 | Stanton | 707/1 |
| 2003/0071890 | A1 | 4/2003 | McClure | 348/14.03 |
| 2003/0149724 | A1 | 8/2003 | Chang | 709/204 |
| 2004/0004942 | A1 | 1/2004 | Nebiker et al. | 370/260 |
| 2004/0010464 | A1 | 1/2004 | Boaz | 705/40 |
| 2005/0024484 | A1 | 2/2005 | Leonard et al. | 348/14.1 |
| 2005/0248652 | A1 | 11/2005 | Firestone et al. | 348/14.09 |
| 2005/0260976 | A1 | 11/2005 | Khartabil et al. | 455/416 |
| 2006/0041571 | A1 | 2/2006 | Kubokawa | 707/101 |
| 2006/0066717 | A1 | 3/2006 | Miceli | 348/14.09 |
| 2006/0129626 | A1 | 6/2006 | Fitzpatrick | 709/200 |
| 2006/0152575 | A1 | 7/2006 | Amiel et al. | 348/14.01 |
| 2006/0158509 | A1 | 7/2006 | Kenoyer et al. | 348/14.08 |
| 2006/0168302 | A1 | 7/2006 | Boskovic et al. | 709/231 |
| 2006/0200518 | A1 | 9/2006 | Sinclair et al. | 709/204 |
| 2006/0251038 | A1 | 11/2006 | Tamura et al. | 370/342 |
| 2006/0259193 | A1 | 11/2006 | Wang et al. | 700/245 |
| 2006/0264207 | A1 | 11/2006 | Tamura et al. | 455/415 |
| 2007/0070940 | A1 | 3/2007 | Vander Veen et al. | 370/328 |
| 2007/0250567 | A1 | 10/2007 | Graham | 709/24 |
| 2008/0062625 | A1 | 3/2008 | Batio | 361/680 |
| 2009/0174764 | A1 | 7/2009 | Chadha et al. | 348/14.09 |
| 2009/0213207 | A1 | 8/2009 | Shah et al. | 348/14.09 |

OTHER PUBLICATIONS

Lambert, Plycom Video Communications, ©2004 *Polycom, Inc.*, 4 pages, Jun. 20, 2004.

Stillerman, *A Look Inside H.239*, www.ihets.org, 3 pages.

Davis, Video communications Industry Backgrounder, *Wainhouse Research*, www.tandberg.net 4 pages.

Dunn, et al., *System and Method for Displaying Participants in a Videoconference between Locations*, U.S. Appl. No. 11/366,861, filed Mar. 2, 2006.

Shah et al U.S. Appl. No. 11/456,735 filed Jul. 11, 2006, *System and Method for Single Action Initiation of a Video Conference*, Communication from the Patent and Trademark Office mailed Jul. 15, 2008.

Graham et al., U.S. Appl. No. 11/483,796 filed Jul. 10, 2006, *System and Method for Controlling a Telepresence System*, Communication from U.S. Patent and Trademark Office mailed Jun. 24, 2008.

Graham et al., U.S. Appl. No. 11/483,796 filed Jul. 10, 2006, *System and Method for Controlling a Telepresence System*, Communication from U.S. Patent and Trademark Office mailed Dec. 1, 2008.

Graham et al., U.S. Appl. No. 11/483,796 filed Jul. 10, 2006, *System and Method for Controlling a Telepresence System*, Communication for U.S. Patent and Trademark Office mailed Jun. 12, 2009.

Ylitalo et al., *Re-thinking Security in IP based Micro-Mobility*, downloaded from www.tcs.hut.fi/Studies/T-79.5401/2005 AUT/ISC04-Vlitalo-4-al.pdf (12 pgs.), 2005.

PCT Notification of Transmittal of the International Search Report and the Written Opinion of the International Searching Authority, re Application No. PCT/US07/09514, dated Oct. 1, 2008, 11 pages, Oct. 1, 2008.

* cited by examiner

SYSTEM AND METHOD FOR DISPLAYING USERS IN A VISUAL CONFERENCE BETWEEN LOCATIONS

RELATED APPLICATIONS

This application claims priority to U.S. Patent Application Ser. No. 60/794,016, entitled "VIDEOCONFERENCING SYSTEM," which was filed on Apr. 20, 2006.

TECHNICAL FIELD

This invention relates generally to the field of telecommunications and more specifically to a system and method for displaying users in a visual conference between locations.

BACKGROUND

There are many methods available for groups of individuals to engage in conferencing. One common method, videoconferencing, involves one or more individuals located in one location engaging in a video conference with one or more individuals located in at least one other location, remote from the first. Videoconferencing involves the use of video equipment, such as cameras and displays. When the remote location has more cameras than the local location has displays, individuals at the local location have an artificial and unrealistic experience during the videoconference. Similarly, individuals at the local location have a diminished experience if the aggregate number of cameras at several remote locations outnumbers the displays at the local location.

SUMMARY OF THE DISCLOSURE

In accordance with particular embodiments, disadvantages and problems associated with previous techniques for displaying users in a visual conference between locations may be reduced or eliminated.

According to one embodiment of the present invention, a method for displaying a visual conference includes receiving a plurality of video signals from at least two cameras located at one or more remote sites. The method also includes assigning each video signal to a respective display of a plurality of displays at a local site for the duration of a visual conference. At least one of the plurality of displays has more than one video signal assigned thereto. The method further includes selecting, for each of the at least one of the plurality of displays having more than one video signal assigned thereto, a video signal of the more than one video signal assigned to the display. The method also includes displaying each selected video signal on its respective display.

In some embodiments selecting a video signal of the more than one video signal may include selecting the video signal having the highest audio level of the more than one video signal. Depending on the embodiments, the method may include assigning each video signal to a respective display based on the relative location and alignment of a first camera in relation to at least one other camera of the at least two cameras or assigning each video signal to a respective display based on a total number of video signals of the plurality of video signals assigned to the respective display.

In some embodiments the method may further include, for each of the at least one of the plurality of displays having more than one video signal assigned thereto, switching between the more than one video signal assigned to the display. In particular embodiments switching between the more than one video signal assigned to the display may include switching to the video signal having the highest audio level of the more than one video signal assigned to the display.

According to another embodiment of the present invention, a system for displaying a visual conference includes an interface operable to receive a plurality of video signals from at least two cameras located at one or more remote sites. The system also includes a processor coupled to the interface and operable to assign each video signal to a respective display of a plurality of displays at a local site for the duration of a visual conference. At least one of the plurality of displays having more than one video signal assigned thereto. The processor is further operable to select, for each of the at least one of the plurality of displays having more than one video signal assigned thereto, a video signal of the more than one video signal assigned to the display. Wherein the plurality of displays are operable to display each selected video signal on the respective display.

Certain embodiments of the invention may provide one or more technical advantages. A technical advantage of one embodiment includes providing a realistic experience to users of a visual conference. In a visual conference environment in which users at a local site view users at a remote site, providing a realistic experience is desirable. The realistic experience may include providing a life-size image of a user at a remote site or simulating a conference table that the users surround. The display mimics an actual conference table where remote users appear as if they are across the table from the local users. Another technical advantage of some embodiments includes providing a realistic, natural experience to local users even though the local site has fewer resources than the remote site(s). Even if a local site has fewer displays to display the video signals, the local site's experience is not compromised. Instead, the quality of the site's experience is maintained.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
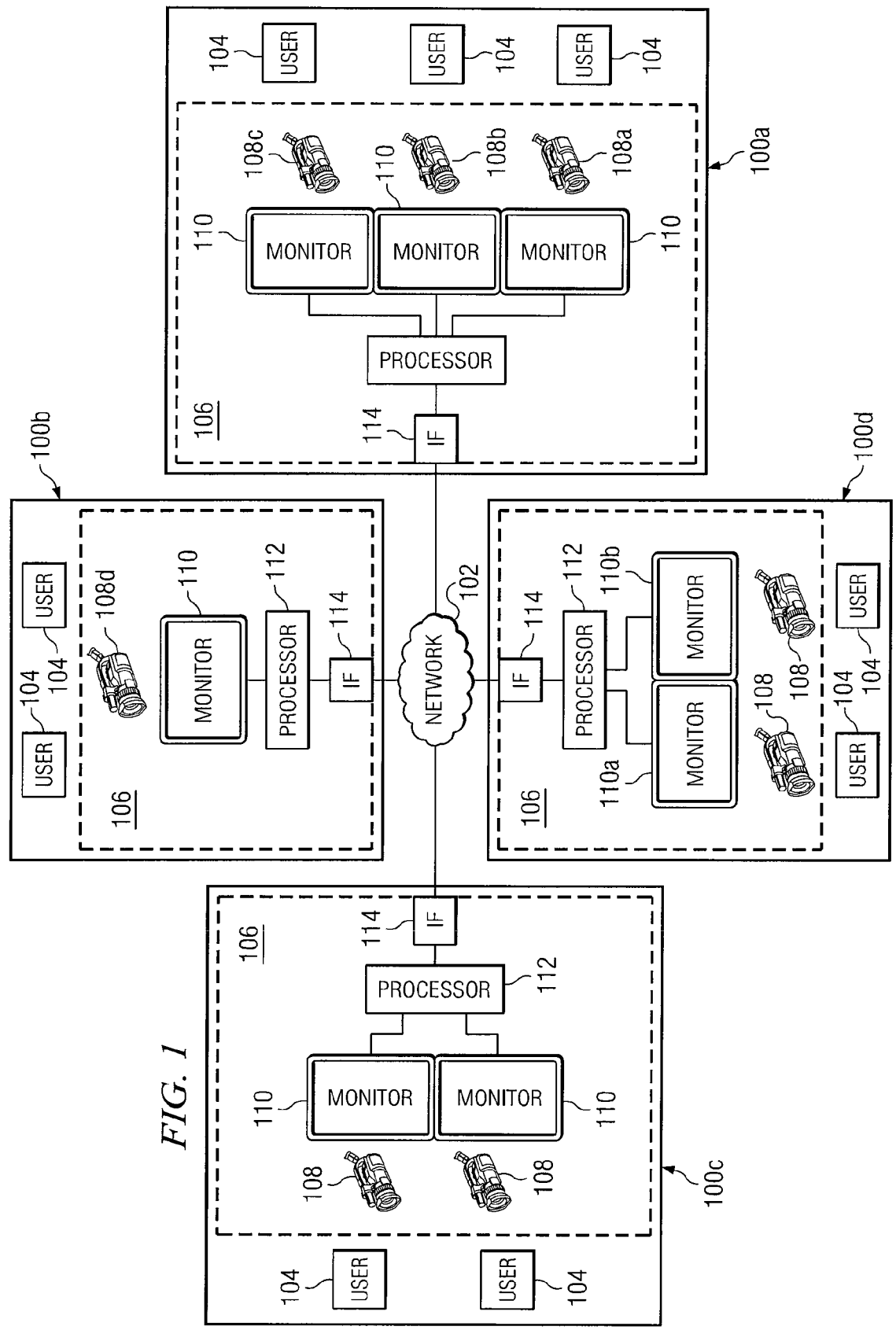
FIG. 1 is a block diagram illustrating a system for videoconferencing between sites, in accordance with some embodiments.
Figure 2:
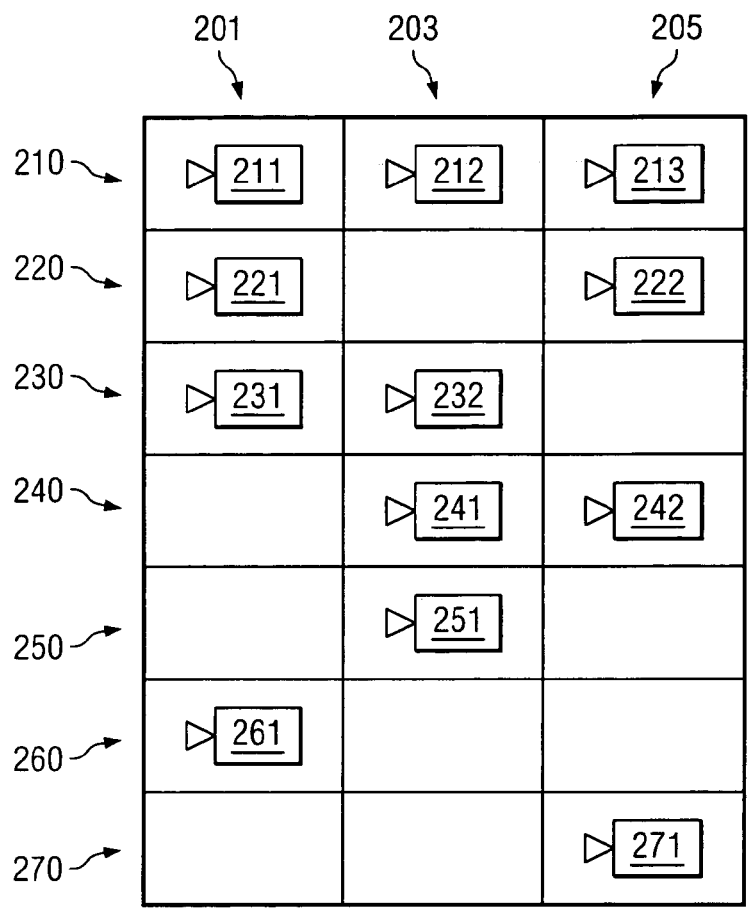
FIG. 2 is a chart illustrating possible assignments of remote video signals to local monitors, in accordance with some embodiments.
Figure 3:
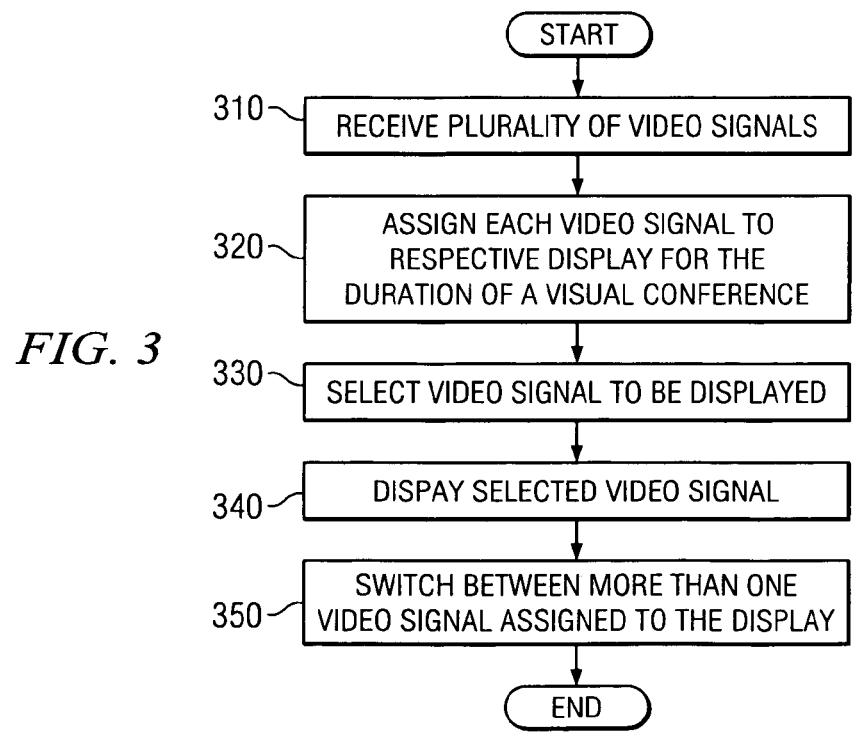
FIG. 3 is a flowchart illustrating a method for displaying users in a visual conference between locations, in accordance with some embodiments.

Embodiments of the present invention and its advantages are best understood by referring to FIGS. 1 through 3 of the drawings, like numerals being used for like and corresponding parts of the various drawings.

FIG. 1 is a block diagram illustrating a system 10 for videoconferencing between locations. The illustrated embodiment includes a network 102 that facilitates a visual conference between remotely located sites 100 using videoconferencing equipment 106. Sites 100 include any suitable number of users 104 that participate in the visual conference. System 10 provides users 104 with a realistic videoconferencing experience even though a local site 100 may have less videoconferencing equipment 106 than remote site 100.

Network 102 represents communication equipment, including hardware and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication link, or any combination of the preceding. Network 102 may include any combination of gateways, routers, hubs, switches, access points, base stations, and any other hardware, software, or a combination of the preceding that may implement any suitable protocol or communication.

User 104 represents one or more individuals or groups of individuals who are present for the visual conference. Users 104 participate in the visual conference using any suitable device and/or component, such as an audio Internet Protocol (IP) phones, video phone appliances, personal computer (PC) based video phones, and streaming clients. During the visual conference, users 104 engage in the session as speakers or participate as non-speakers.

Videoconferencing equipment 106 facilitates the videoconferencing among users 104. Videoconferencing equipment 106 may include any suitable elements to establish and facilitate the visual conference. For example, videoconferencing equipment 106 includes speakers, microphones, or a speakerphone. In the illustrated embodiment, videoconferencing equipment 106 includes cameras 108, displays 110, a processor 112, and a network interface 114.

Cameras 108 include any suitable hardware and/or software to facilitate capturing an image of user 104 and providing the image to other users 104. Cameras 108 capture and transmit the image of user 104 as a video signal. Displays 110 include any suitable hardware and/or software to facilitate receiving the video signal and displaying the image of user 104 to other users 104. For example, displays 110 may include a notebook PC or a wall mounted display. Displays 110 display the image of user 104 using any suitable technology that provides a realistic image, such as high definition, high-power compression hardware, and efficient encoding/decoding standards. Videoconferencing equipment 106 establishes the visual conference session using any suitable technology and/or protocol, such as Session Initiation Protocol (SIP) or H.323. Additionally, videoconferencing equipment 106 may support and be interoperable with other video systems supporting other standards, such as H.261, H.263, and/or H.264.

Processor 112 controls the operation and administration of videoconferencing equipment 106 by processing information and signals received from cameras 108 and interface 114. Processor 112 includes any suitable hardware, software, or both that operate to control and process signals. For example, processor 112 may be a programmable logic device, a microcontroller, a microprocessor, any suitable processing device, or any combination of the preceding. Interface 114 communicates information and signals to and receives information and signals from network 102. Interface 114 represents any port or connection, real or virtual, including any suitable hardware and/or software that allow videoconferencing equipment 106 to exchange information and signals with network 102, other videoconferencing equipment 106, or and/or other elements of system 10.

In an example embodiment of operation, users 104 at sites 100a and 100d participate in a visual conference. When users 104 join the visual conference, a video signal is generated for each camera 108 that is assigned to a monitor 110. This assignment may persist for the duration of the visual conference. Thus, a remote user may always be displayed on the same local monitor. This may make it easier for local users to identify who and where the remote user is. More specifically, in the embodiment depicted in FIG. 1, bottom camera 108a may be assigned to left monitor 110a, middle camera 108b may be assigned to right monitor 110b and top camera 108c may be assigned to right monitor 110b. Because right monitor 110b has both middle camera 108b and top camera 108c assigned to it, the monitor may switch between cameras 108b and 108c based on which user last spoke, or which user is currently speaking the loudest. If users 104 from site 100b were to join the visual conference, the image from camera 108d may be assigned to left monitor 110a. Thus, as various users 104 speak during the visual conference, the video signal displayed on each monitor 110 may change to display the image of the last speaker.

Modifications, additions, or omissions may be made to system 10. For example, system 10 may include any suitable number of sites 100 and may facilitate a visual conference between any suitable number of sites 100. As another example, sites 100 may include any suitable number of cameras 108 and displays 110 to facilitate a visual conference. As yet another example, the visual conference between sites 100 may be point-to-point conferences or multipoint conferences. For point-to-point conferences, the number of displays 110 at local site 100 is less than the number of cameras 108 at remote site 100. For multipoint conferences, the aggregate number of cameras 108 at remote sites 100 is greater than the number of displays 110 at local site 100. Moreover, the operations of system 10 may be performed by more, fewer, or other components. Additionally, operations of system 10 may be performed using any suitable logic.

FIG. 2 is a chart illustrating possible assignments of remote video signals to local monitors, in accordance with some embodiments. More specifically, depicted in FIG. 2 is the assignment of the video signals from remote cameras from seven different remote sites, remote sites 210, 220, 230, 240, 250, 260 and 270, to three different local displays, displays (or monitors) 201, 203 and 205. Each video signal is represented by a camera (e.g., video signals 211, 212, 213, 221, 222, 231, 232, 241, 242, 251, 261 and 271). As can be seen there are several more video signals than there are monitors.

Each video signal may be assigned to only one monitor, and thus each user may only be displayed on one monitor. This may allow local users viewing local monitors to become familiar with the location of each user.

Remote site 210 has three video signals, left video signal 211, center video signal 212 and right video signal 213. The assignment in this situation may be relatively straight forward because the number of local displays is equal to the number of video signals. However, it may be desirable to determine to which particular display each video signal is assigned. One factor that may be used by some embodiments is the relative position of the remote cameras generating the video signals in relation to each other. More specifically, left video signal 211 may be assigned to the left local display 201, center video signal 212 may be assigned to center display 203, right video signal 213 may be assigned to right monitor 205. This may provide for a more natural appearance in eye contact between the remote users displayed on the local monitors and the local users viewing the local monitors.

Remote sites 220 through 240 each have two video signals, left video signal 221, 231 and 241, respectively, and right video signals 222, 232, and 242, respectively. Left video signal 221 may be assigned to left monitor 201 and right video signal 222 may be assigned to right monitor 205 to optimize the natural appearance of the eye contact between local and remote users.

In assigning the video signals of remote sites 230 and 240 it may not always be desirable to automatically assign them to left monitor 201 and right monitor 205. This may be because doing so may cause there to be an excess of video signals assigned to left monitor 201 and right monitor 205 and a shortage of video signals assigned to center monitor 203. This may be an inefficient use of monitor resources. Thus it may be desirable to use alternate assignment. However, it may still be desirable to optimize the eye contact between local and remote users in the alternate assignments. By maintaining the relative position of the video signals at least two additional alternate assignments may be used. For example, remote site 230 may have its video signals assigned to the two left most displays, while remote site 240 may have its two video signals assigned to the two right most displays. More specifically, left video signal 231 is assigned to left monitor 201, right video signal 232 is assigned to center monitor 203, left video signal 241 is assigned to center monitor 203 and right video signal 242 is assigned to right monitor 205. Thus, the left video signals (e.g., 231 and 241) remain to the left of the right video signals (e.g., 232 and 242).

Remote sites 250 through 270 each have a single video signal. Because there may not be an concerns with the position of the video signal in relation to other video signals from the same site, assigning the video signals to a monitor may be relatively straight forward. In assigning the single video signal from each remote site, one factor that may be considered is the relative priority of the user associated with the video signal. For example, if the president of a company is associated with video signal 251 it may be desirable to have video signal 251 assigned to center monitor 203. Another factor that may be considered in assigning a single video signal from a remote site may be the number of video signals that have already been assigned to a local monitor. For example, in assigning video signal 261 (assuming that the video signals from remote sites 210-250 have already been assigned) it may not be desirable to assign video signal 261 to center monitor 203 because center monitor 203 already has four video signals assigned to it, while monitors 201 and 205 only have three video signals assigned to them. Thus, in this situation it may be desirable to assign video signal 261 to one of the side monitors, such as left monitor 201.

Modifications, additions, or omissions may be made while displaying video signals on local monitors 201, 203 and 205. For example, there may be a different number of local monitors (e.g., 1, 2, 4 or more monitors) to which video signals may be assigned. As another example, a remote site may have more video signals than there are local monitors. For example, the video signals of remote site 220 may be part of remote site 210 (thus remote site 210 may have five video signals, 211, 212, 213, 221 and 222). In such a case the assignment may take into account the factors discussed above in assigning the video signals (e.g., video signal 221 may be the left most video signal, video signal 211 may be the second left most video signal, video signal 212 may be the center video signal, video signal 213 may be the second right most video signal and video signal 222 may be the right most video signal). Similarly, the assignment may last for the duration of the visual conference, thereby increasing the comfort and familiarity that local users may have in knowing who and where the speaker is.

FIG. 3 is a flowchart illustrating a method for displaying users in a visual conference between locations, in accordance with some embodiments. The method begins at step 310 where a plurality of video signals are received. The video signals may be generated by a corresponding plurality of remote cameras. The remote cameras may all be located at the same remote site or they may be spread out among multiple remote sites. Regardless of the site at which the remote cameras are located, the video signals they generate are assigned to a respective display for the duration of the visual conference at step 320.

Because each video signal is assigned to a respective display for the duration of the visual conference, those users participating in a visual conferencing locally may be able quickly identify who and where the speaker is. This may be because the video signal containing the image and sound of a particular user may always be displayed on the same display, so local users may not need to search multiple monitors to locate the speaker.

If the number of video signals is less than or equal to the number of displays then for each display that is to be used (if there are five displays and two video signals, two displays will have a video signal assigned thereto while the remaining three displays may be unused or may display other content) a video signal may be assigned. In assigning video signals to displays one or more of several different factors may be used. Some example factors may include: the relative position of the remote user in relation to the other remote users; the relative position and alignment of the remote camera to the remote user and/or the other remote cameras; the associated priority of the user (e.g., the president of the company may be displayed in a center display); the order in which the video signals joined the visual conference; or any other factor that may be deemed advantageous in determining where to assign a video signal.

Because of the possibility of there being more remote video signals received and assigned than there are local displays, it may be that one or more of the displays may have more than one video signal assigned thereto. In such a case, the assignment of each video signal may, in addition to the above factors, also consider such factors as the number of video signals that have been assigned to a particular display.

In the situation in which there are more displays than there are video signals, steps 330 through 350 may be fairly straightforward. More specifically, the video signal selected at step 330 and displayed at 350 may be the only video signal assigned to the respective display. Additionally, because there may not be other video signals assigned to the display, there may not be a need to switch between video signals at step 350.

In the situation in which there are more video signals than there are displays, at step 330, one video signal for each display may be selected from the plurality of video signals assigned to the display. The selected signal may then be displayed on the respective display at step 340. In making the initial selection (e.g., before the visual conference begins) as to which video signal to display such factors as the order in which the video signals were assigned to the display or the relative priority of the user assigned to the display may be considered.

At step 350 it may be possible to switch from the currently displayed video signal to a new video signal. Recall that both the current video signal and the new video signal were previously assigned to the display. In some embodiments the switch may occur when it is detected that a user, other than the user currently displayed, has talked. As soon as it is detected that a new user has begun to talk, the switch may occur. Thus, each display may currently be displaying the video signal, of the plurality of video signals assigned to the display, associated with the last user to speak.

Modifications, additions, or omissions may be made to the method depicted in FIG. 3. The flowchart may include more, fewer, or other steps. For example, before switching between video signals at step 350, a transition effect may be used to transition between video signals. Additionally, steps may be performed in any suitable order and by any suitable component.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for displaying a visual conference, comprising:
receiving a plurality of video signals from at least two cameras located at one or more remote sites;
assigning each video signal to a respective display of a plurality of displays at a local site for the duration of a visual conference, at least one of the plurality of displays having more than one video signal assigned thereto;
selecting, for each of the at least one of the plurality of displays having more than one video signal assigned thereto, a video signal of the more than one video signal assigned to the display; and
displaying each selected video signal on its respective display.

2. The method of claim 1, wherein selecting a video signal of the more than one video signal comprises selecting the video signal having the highest audio level of the more than one video signal.

3. The method of claim 1, wherein assigning each video signal to a respective display comprises assigning each video signal to a respective display based on the relative location and alignment of a first camera in relation to at least one other camera of the at least two cameras.

4. The method of claim 1, wherein assigning each video signal to a respective display comprises assigning each video signal to a respective display based on a respective total number of video signals of the plurality of video signals assigned to each respective display.

5. The method of claim 1, further comprising, for each of the at least one of the plurality of displays having more than one video signal assigned thereto, switching between the more than one video signal assigned to the display.

6. The method of claim 5, wherein switching between the more than one video signal assigned to the display comprises switching to the video signal having the highest audio level of the more than one video signal assigned to the display.

7. Logic for displaying a visual conference, the logic embodied in a computer readable medium and comprising code operable to:
receive a plurality of video signals from at least two cameras located at one or more remote sites;
assign each video signal to a respective display of a plurality of displays at a local site for the duration of a visual conference, at least one of the plurality of displays having more than one video signal assigned thereto;
select, for each of the at least one of the plurality of displays having more than one video signal assigned thereto, a video signal of the more than one video signal assigned to the display; and
display each selected video signal on its respective display.

8. The medium of claim 7, wherein the code operable to select a video signal of the more than one video signal comprises code operable to select the video signal having the highest audio level of the more than one video signal.

9. The medium of claim 7, wherein the code operable to assign each video signal to a respective display comprises code operable to assign each video signal to a respective display based on the relative location and alignment of a first camera in relation to at least one other camera of the at least two cameras.

10. The medium of claim 7, wherein the code operable to assign each video signal to a respective display comprises code operable to assign each video signal to a respective display based on a respective total number of video signals of the plurality of video signals assigned to each respective display.

11. The medium of claim 7, wherein the code is further operable to, for each of the at least one of the plurality of displays having more than one video signal assigned thereto, switch between the more than one video signal assigned to the display.

12. The medium of claim 11, wherein the code operable to switch between the more than one video signal assigned to the display comprises code operable to switch to the video signal having the highest audio level of the more than one video signal assigned to the display.

13. A system for displaying a visual conference, comprising:
an interface operable to receive a plurality of video signals from at least two cameras located at one or more remote sites;
a processor coupled to the interface and operable to:
assign each video signal to a respective display of a plurality of displays at a local site for the duration of a visual conference, at least one of the plurality of displays having more than one video signal assigned thereto;
select, for each of the at least one of the plurality of displays having more than one video signal assigned thereto, a video signal of the more than one video signal assigned to the display; and
display each selected video signal on the respective display.

14. The system of claim 13, wherein the processor operable to select a video signal of the more than one video signal comprises a processor operable to select the video signal having the highest audio level of the more than one video signal.

15. The system of claim 13, wherein the processor operable to assign each video signal to a respective display comprises a processor operable to assign each video signal to a respective display based on the relative location and alignment of a first camera in relation to at least one other camera of the at least two cameras.

16. The system of claim 13, wherein the processor operable to assign each video signal to a respective display comprises a processor operable to assign each video signal to a respective display based on a respective total number of video signals of the plurality of video signals assigned to each respective display.

17. The system of claim 13, wherein the processor is further operable to for each of the at least one of the plurality of displays having more than one video signal assigned thereto, switch between the more than one video signal assigned to the display.

18. The system of claim 17, wherein the processor operable to switch between the more than one video signal assigned to the display comprises a processor operable to switch to the video signal having the highest audio level of the more than one video signal assigned to the display.

19. A system for displaying a visual conference, comprising:

means for receiving a plurality of video signals from at least two cameras located at one or more remote sites;

means for assigning each video signal to a respective display of a plurality of displays at a local site for the duration of a visual conference, at least one of the plurality of displays having more than one video signal assigned thereto;

means for selecting, for each of the at least one of the plurality of displays having more than one video signal assigned thereto, a video signal of the more than one video signal assigned to the display; and means for displaying each selected video signal on its respective display.

* * * * *